(12) United States Patent
Guinan et al.

(10) Patent No.: US 7,941,371 B1
(45) Date of Patent: May 10, 2011

(54) SYSTEM AND METHOD FOR AN AUTOMATED DEPOSITORY ACCOUNT PLEDGED AS SECURITY

(75) Inventors: Richard Guinan, Charlotte, NC (US); Brian P. Boland, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 11/936,517

(22) Filed: Nov. 7, 2007

(51) Int. Cl.
*G06Q 40/00* (2006.01)

(52) U.S. Cl. ............................................. 705/39; 705/40

(58) Field of Classification Search ............... 705/10–44
See application file for complete search history.

(56) References Cited

U.S. PATENT DOCUMENTS

| | | | | |
|---|---|---|---|---|
| 5,802,499 A * | 9/1998 | Sampson et al. | ................. | 705/35 |
| 6,105,007 A * | 8/2000 | Norris | .............................. | 705/38 |
| 6,609,113 B1 * | 8/2003 | O'Leary et al. | ................. | 705/39 |
| 6,658,568 B1 * | 12/2003 | Ginter et al. | ................... | 713/193 |
| 6,721,713 B1 * | 4/2004 | Guheen et al. | ................. | 705/1.1 |
| 7,133,846 B1 * | 11/2006 | Ginter et al. | .................... | 705/54 |
| 7,165,174 B1 * | 1/2007 | Ginter et al. | .................. | 713/153 |
| 7,536,347 B2 * | 5/2009 | Tyson-Quah | .................. | 705/38 |

OTHER PUBLICATIONS

Deposit Account Control Agreement, Oct. 7, 2005, http://agreements.realdealdocs.com/Account-Control-Agreement/DEPOSIT-ACCOUNT-.*
Alan M. Christenfeld, Shepard Melzer, Deposit Account Control Agreements, *New York Law Journal*, vol. 229, Jun. 5, 2003, 7 pages.

* cited by examiner

*Primary Examiner* — Frantzy Poinvil
(74) *Attorney, Agent, or Firm* — Stephen C. Glazier; K&L Gates LLP

(57) ABSTRACT

Embodiments of a system and method for administering a deposit account are disclosed. In an embodiment, a secured party may directly access a deposit account electronically and withdraw funds that are pledged to secure an obligation under the terms of a deposit account control agreement, without prior notification of such withdrawal to the bank, and without the active human participation of bank employees. An embodiment of the method includes the secured party accessing the deposit account electronically using a joint account holder personal identification number. An alternative embodiment of the method includes the secured party accessing the deposit account electronically using the secured party's personal identification number. An embodiment of the system includes a user interface for displaying deposit account information and accepting instructions to transfer funds out of the deposit account. An embodiment of the system includes a user interface for displaying information about two or more deposit accounts.

45 Claims, 6 Drawing Sheets

SYSTEM AND METHOD FOR AN AUTOMATED DEPOSITORY ACCOUNT PLEDGED AS SECURITY

FIELD OF THE INVENTION

Embodiments of the invention generally relate to a secured party exercising control over a debtor's deposit account. Particular embodiments of the invention relate to methods and systems for implementing a secured party's to access a deposit account pledged to it as security in the event that the debtor defaults on its obligations to the secured party.

BACKGROUND OF THE INVENTION

Depositary banks and secured parties have difficulty administering commercial deposit accounts that are pledged by their depositor-debtors as security and that are subject to a deposit account control agreement among the debtor, the secured party, and the bank (a "DACA"). Implementing a DACA requires a bank to keep employees available to the secured party to receive and implement the secured party's instructions to terminate a debtor's access to and disposition over its account. The bank also exposes itself to the risk, among others, of being sued by the secured party or other claimants when the bank implements the secured party's instruction to terminate the debtor's access to and disposition over its account or other instruction of the secured party concerning the account.

There is also a delay between the time that the secured party determines that the debtor has defaulted on its loan obligations to the secured party and the time of the termination of the debtor's access to and disposition over its aAccount. Once the secured party determines that the debtor is in default, the secured party must contact the bank, convince the bank's employee(s) that the secured party has the right under the DACA to instruct the bank to terminate the debtor's access to and disposition over the account, and then wait while the necessary procedures are undertaken by the bank to implement the secured party's instruction to terminate the debtor's access to and disposition over the account. During this period of time between the secured party's instruction and the implementation thereof by the bank, the debtor has the opportunity to withdraw funds from the account, thereby diluting the secured party's security interest in the account.

Banks incur significant legal and business risks and administrative expenses in entering into and implementing DACAs, and secured parties are exposed to the risk that the debtor may have the opportunity to withdraw funds from the account before the secured party can terminate the debtor's access to and disposition over the account. Therefore, a need exists for an improved way for banks and secured parties to implement DACAs without the current disadvantages.

BRIEF DESCRIPTION OF THE DRAWINGS

Various embodiments and other aspects of this invention will be readily apparent from the detailed description below and the appended drawings, which are meant to illustrate and not to limit the invention, and in which.

DETAILED DESCRIPTION OF EMBODIMENTS

The inventors have identified the need to create a new way for a secured party under a deposit account control agreement (a "DACA") to exercise control over a debtor's account that has been pledged by the debtor to secure a loan or other obligation to the secured party. In an embodiment, under the terms and provisions of a DACA, a secured party may directly access an account and withdraw funds that are pledged to secure a loan or other obligation to the secured party, without prior notification of or manual instruction for such withdrawal to the bank, and without the active human participation of bank employees.

Although many embodiments discussed herein refer to loans and liens, embodiments may also apply to other types of obligations with pledged security including, but not limited to, covenants, guarantees, indemnities, escrows, or bonds. In addition, while embodiments discussed herein refer to debtors and secured parties regarding loans, embodiments may also apply to obligors and obligees regarding other obligations.

It can be appreciated by those skilled in the art that embodiments of the methods and systems described herein provide many benefits. An embodiment allows debtors, secured parties, and banks to efficiently implement a DACA. An embodiment also allows a secured party to electronically exercise control of an account in the event of default by the debtor without requiring the manual participation of the bank's employees. As a result, a secured party is able to more quickly exercise its control over an account when the debtor defaults, and to limit the debtor's opportunity to avoid the secured party's foreclosure of the funds in the account by withdrawing from the account; and the bank is able to reduce the legal and business risks and administrative costs associated with implementing the secured party's instructions as required by the terms and provisions of a DACA.

Figure 1:
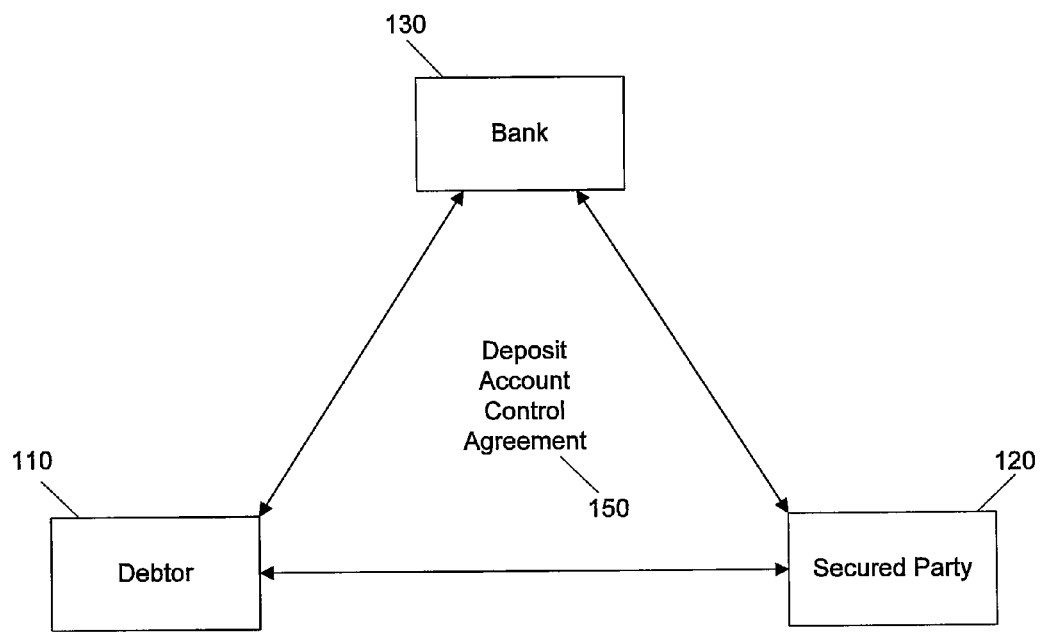
FIG. 1 shows an example of a configuration according to various embodiments of the invention.
Figure 2:
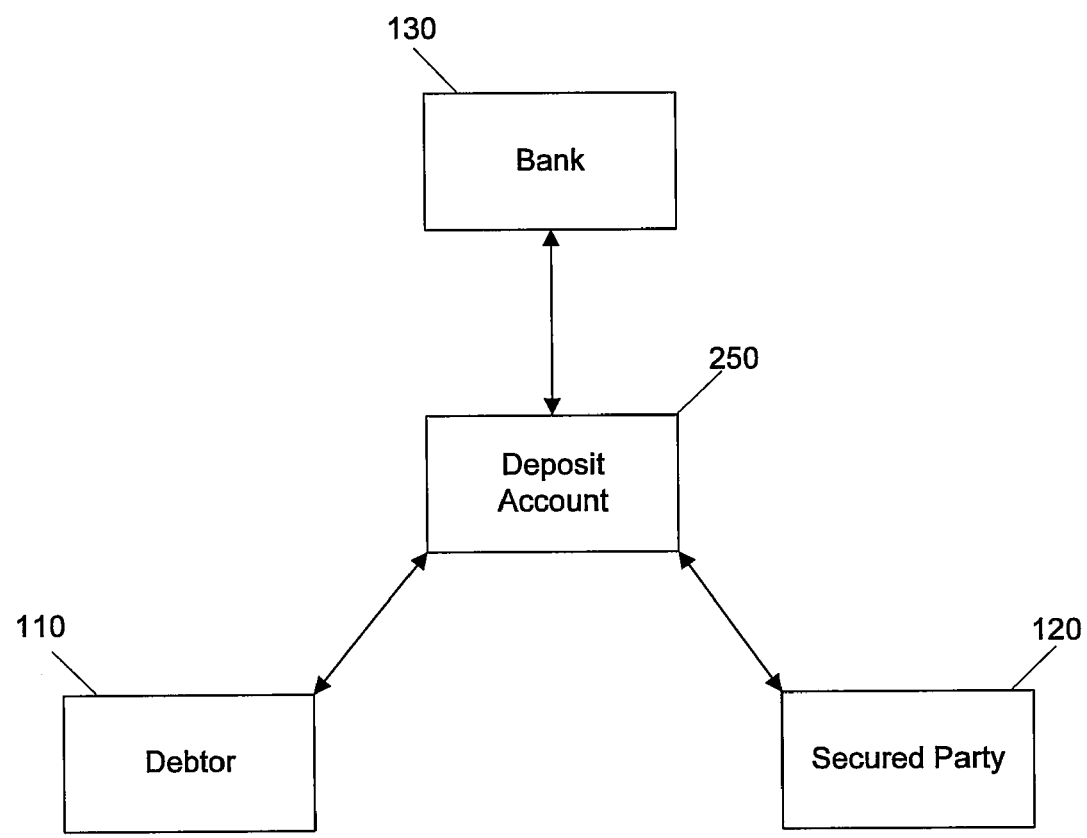
FIG. 2 shows an example of a configuration according to various embodiments of the invention.

With reference to FIG. 1 and FIG. 2, examples of configurations according to various embodiments of the invention are illustrated. In various embodiments, configuration 100 may include the debtor 110, the secured party 120, and the bank 130. In various embodiments, the debtor 110 may be any type of legal entity such as, for example, an individual, corporation, limited liability company, limited liability partnership, cooperative, partnership, trust, or joint venture. In various embodiments the secured party 120 may be any type of legal entity such as, for example, an individual, corporation, limited liability company, limited liability partnership, cooperative, partnership, trust, or joint venture. In various embodiments, the bank 130 may be any organization that is engaged in the business of banking as the term "bank" is defined in Revised Article 9 of the Uniform Commercial Code, which definition also includes savings banks, savings and loan associations, credit unions and trust companies. In various embodiments, the secured party 120 and the bank 130 may be the same entity.

In various embodiments, deposit account control agreement ("DACA") 150 is a three-party agreement entered into by the debtor 110, the secured party 120, and the bank 130. Account 250 is an account maintained by the bank 130 and used by the debtor 110, and which can be accessed by entering a security code (e.g., a personal identification number or other multifactor identification and authorization security procedure (collectively, a "PIN")). The DACA 150 specifies the terms under which the debtor 110 pledges its account 250 to secure a loan or other financial consideration made by the secured party 120. The DACA 150 may be, for example, a deposit account control agreement as contemplated by the provisions of Revised Article 9 the Uniform Commercial Code, and may be as described in Appendix A and Appendix B herein, with an addendum modifying the provisions regarding the manner in which the secured party 120 may instruct the bank 130 specific to embodiments of the invention. The DACA 150 may include provisions that: 1) identify the account; 2) specify the manner in which the secured party 120 may instruct the bank 130 on the account 250; and 3) specify the conditions under which the secured party 120 shall have the right to exercise its control over the account 250. Once the secured party 120 exercises its control over the account 250, the secured party 120 may, for example, instruct the bank 130 to withdraw or transfer funds from the account 250, or merely prevent the debtor 110 from having access to or disposition over its account 250.

In various embodiments, the DACA 150 may also specify, for example: 1) that the secured party 120 will use the same PIN as the debtor 110 to access the account 250; or 2) that the bank 130 will provide a joint account holder PIN to the secured party 120. The joint account holder PIN is a second PIN designated by the bank 130 to the same deposit account 250, and the joint account holder PIN does not provide any additional functions or limit the actions that the secured party 120 may perform while accessing the account 250.

In various embodiments, the DACA 150 may specify that the bank 130 will provide the secured party 120 access to account 250 with a second PIN. The second PIN is provided by the bank 130 to the secured party 120 and such second PIN is different from the debtor's PIN for the account 250. Since the second PIN is solely for the secured party 120 to use, the secured party 120 may associate several deposit accounts with the second PIN. This may allow the secured party 120 to monitor more than one deposit account without logging in separately to each individual deposit account. As a result, the secured party 120 can more efficiently monitor, when appropriate, more than one deposit account in which the secured party 120 has a lien. In various embodiments, the accounts may belong to the same debtor or to more than one debtor. In addition, when the secured party 120 uses the second PIN, the bank 130 may restrict the functions available to the secured party 120. For example, the secured party 120 may only be able to monitor or freeze the account 250.

Figure 1A:
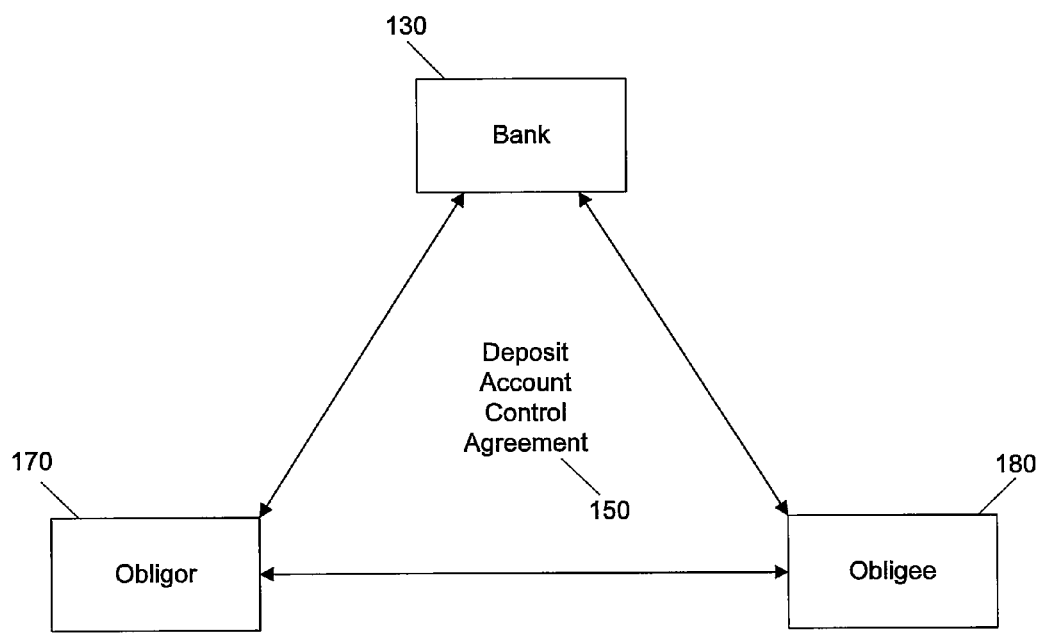
FIG. 1a shows an example of a system according to various embodiments of the invention.
Figure 2A:
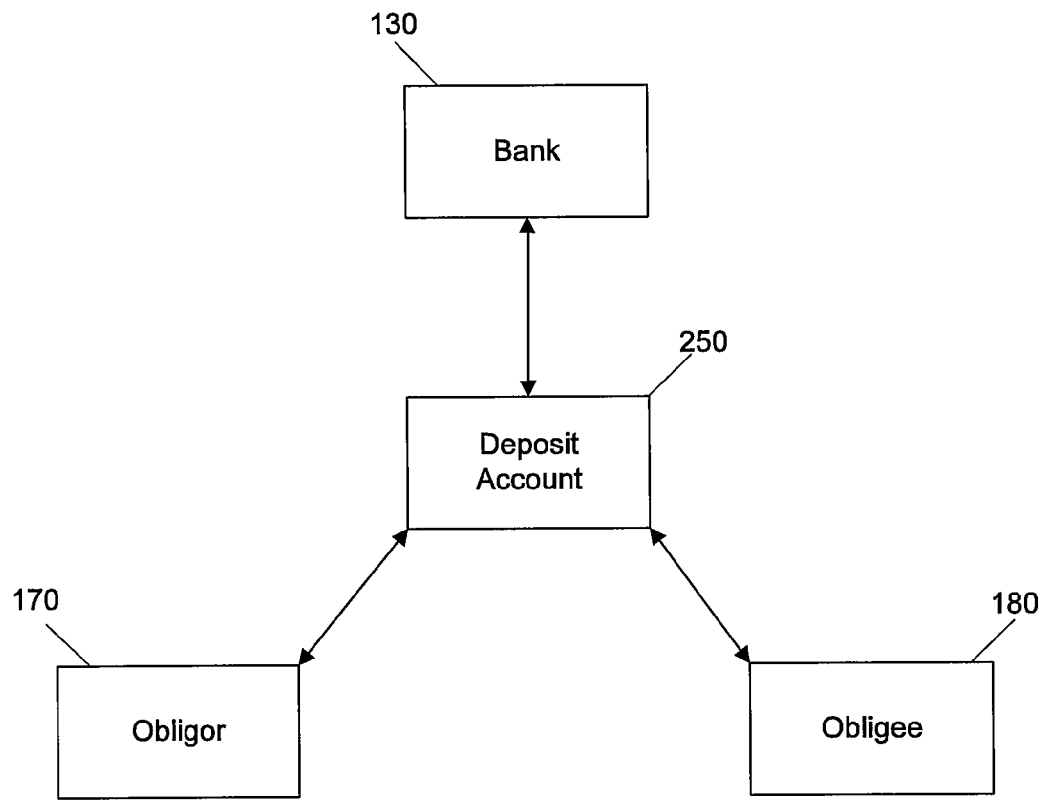
FIG. 2a shows an example of a configuration according to various embodiments of the invention.

With reference to FIG. 1a and FIG. 2a, examples of configurations according to various embodiments of the invention are illustrated. In various embodiments, an obligor 170 pledges its deposit account 250 to an obligee 180 in the same manner as described above, i.e., the way the debtor 110 pledges its account 250 to the secured party 120. In various embodiments, an obligor 170 pledges its deposit account 250 to an obligee 180 to secure a covenant, guarantee, indemnity, escrow, or bond of the obligor.

Figure 3:
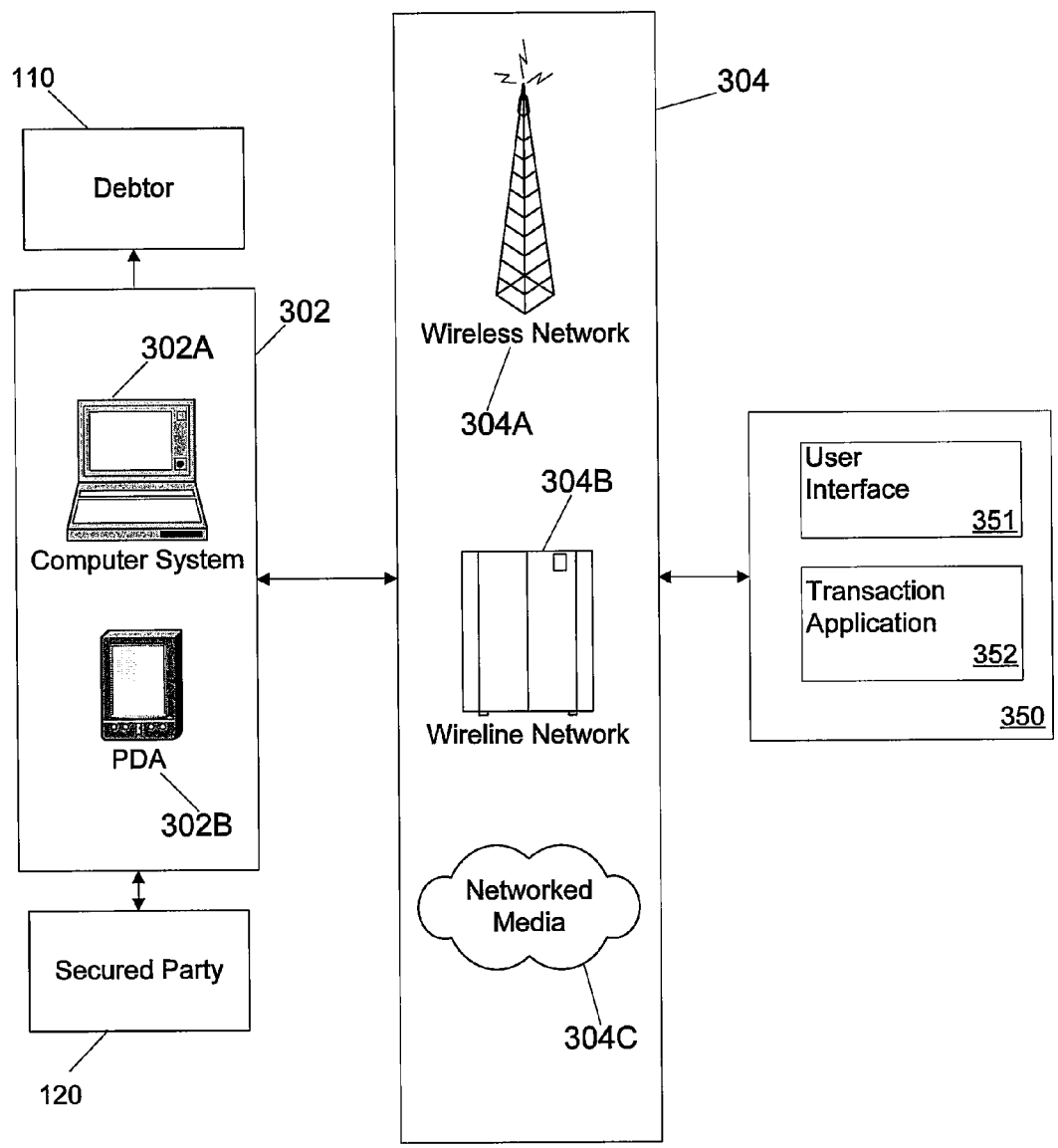
FIG. 3 shows an example of a system according to various embodiments of the invention.

FIG. 3 illustrates an example of a system architecture according to various embodiments of the invention. A banking application 350 may include a user interface 351 and a transaction application 352. In various embodiments, the banking application 350 may be implemented by the bank 130 on, for example, a web-based server or another suitable server or computer system. In various embodiments, the user interface 351 and transaction application 352 may be software programs, for example, or other applications or devices that execute programs in association with the bank's banking application 350. User interface 351 and transaction application 352 may be programmed in any of a variety of suitable programming languages, such as C++, C, Java, and/or a variety of other kinds of software programming languages that may be applied to create instructions in accordance with embodiments of the invention.

In various embodiments, the debtor 110 and the secured party 120 may communicate with the banking application 350 through a variety of communication access devices 302 that can operate in a variety of communication media 304. Examples of access devices 302 include, without limitation, computer systems 302A (e.g., notebooks, desktops, etc.) and personal data assistants 302B (PDAs). Examples of communication media 304 include, without limitation, wireless networks 304A, wireline networks 304B, and/or a variety of networked media 304C (e.g., intranets or the Internet). It can be seen that the access devices 302 and communication media 304 can be employed by the secured party 120 to perform various functions, such as, for example, monitoring the balance in account 250.

In various embodiments, the user interface 351 may be configured to allow the debtor 110 and the secured party 120 to communicate with the banking application 350 using, for example, one or more of a web-based graphical user interface, e-mail messages, and text messages. The user interface 351 may also be configured to provide security systems to prevent unauthorized access to the banking application 350.

In various embodiments, the user interface 351 may be configured to allow the debtor 110 to access the account 250 in the same manner that the debtor 110 accesses an ordinary deposit account. The user interface 351 may be configured to also allow the secured party 120 to access the account 250 as if the secured party 120 were a joint account holder of the account 250 with the debtor 110. As a joint account holder, secured party 120 would be able to engage in the same banking activities and utilize the same banking services and products that the debtor 110 enjoys with the bank 130. The user interface 351 may be configured for the bank 130 to accept a PIN from the secured party 120 to log in to the banking application 350. In various embodiments, the secured party 120 may use the same PIN that the debtor 110 uses to log in to banking application 350 or secured party 120 may use a joint account holder PIN to log in to banking application 350. In various embodiments, the user interface 351 may be configured to allow secured party 120 to log in the banking application 350 to access account 250 using a second PIN as described above.

Once the secured party 120 is logged in to the banking application 350, the user interface 351 may be configured to display the balance and activity of the account 250. The user interface 351 may also be configured to accept instructions of the secured party 120 permitted by the DACA to the bank 130 to, for example, transfer funds out of the account 250 in accordance with the normal function of banking products offered by the bank 130 for transferring funds that have been made available by the bank 130 to the debtor 110.

In various embodiments, the user interface 351 can be configured to allow the bank 130 to accept instructions from the debtor 110 or secured party 120, as permitted or required by the DACA 150, to provide a notification to the other if a certain event takes place. For example, debtor 110 may instruct the banking application 350 to send an electronic textual communication to the debtor 110 if, for example, the secured party 120 transfers funds out of account 250. In addition, the secured party 120 may instruct the banking application 350 to send an electronic textual communication to the secured party 120 in the event that, for example, the balance in account 250 falls below a specified minimum balance.

In various embodiments, user interface 351 can be configured to allow debtor 110 and secured party 120 to choose the medium through which notifications are transmitted. For example, debtor 110 can choose to receive notifications by one or more of e-mail, text message, or display within user interface 351.

In various embodiments, if the debtor 110 were to default on its indebtedness obligations to the secured party 120 and the secured party 120 were to consequently exercise its control over the account 250 and transfer the available funds from the account 250 using the banking application 350, the user interface 351 could be configured to permit the secured party 120 to instruct banking application 350 to send an e-mail, text message, or display a notice in the user interface 351 to the secured party 120 if thereafter additional items shall be deposited to and funds become available in the account 250.

Figure 4:
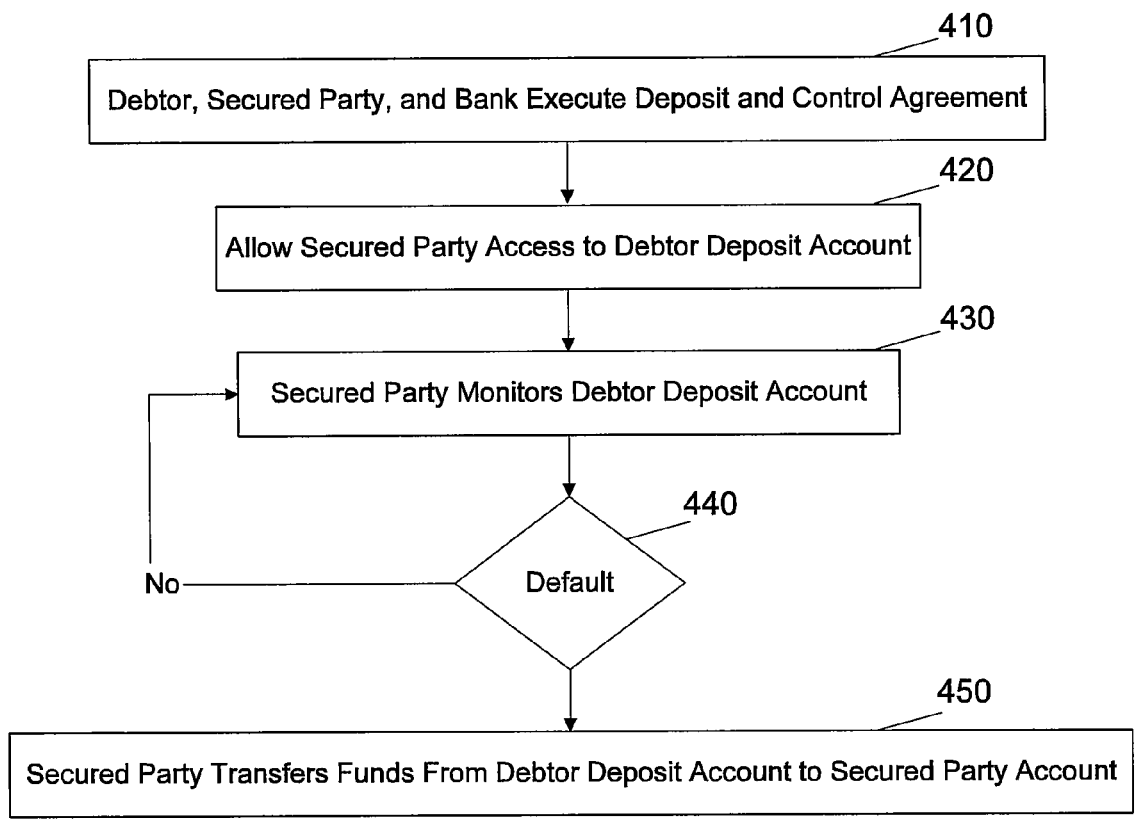
FIG. 4 shows an example of a process flow according to various embodiments of the invention.

FIG. 4 illustrates an example of the process flow of various embodiments. At step 410, the debtor 110, the secured party 120, and the bank 130 execute a DACA 150 as described above. At step 420, the bank 130 permits the secured party 120 to access the account 250 electronically.

At step 430, the secured party 120 electronically monitors the activity in the account 250. The secured party 120 may monitor the account 250 in order to, for example, ensure that debtor 110 is still using the account 250 or to ensure that the balance in the account 110 exceeds the minimum average daily balance required by provisions of the DACA 150.

In various embodiments, the secured party 120 may have executed more than one DACA with the bank 130 for accounts of a single debtor 110 or for accounts of multiple debtors 110. One or more of the accounts 250 controlled by the various DACAs may be with various other debtors 110 that are depository banking customers of the bank 130. A user interface 351 can be configured to permit the secured party 120 to view all of the accounts over which the secured party 120 has control via DACAs at the same time.

At step 440, the secured party 120 determines whether debtor 110 is in default. As long as the debtor 110 shall continue to make the payments it has agreed to make in accordance with the provisions of the debtor's 110 agreements with the secured party 120, then the secured party 120 shall continue to passively monitor the activity in the account 250. If, however, the debtor 110 fails to make the payments in accordance with the provisions of the debtor's 110 agreements with the secured party 120, then, at step 450, the secured party 120 can exercise its default remedies and can electronically transfer the available funds from the account 250 to an account that the debtor 110 cannot access.

Because the secured party 120 has direct electronic access to the account 250, the bank 130 does not need to be involved in the manual implementation of the secured party's 120 determination to transfer funds from the account 250. Consequently, the risk of Bank 130 being subjected to claims by the debtor 110 for wrongfully or negligently transferring funds from the account 250 to the secured party 120 could be significantly diminished. Further, the risk of the bank 130 being subjected to claims by the secured party 120 for wrongfully or negligently transferring funds from the account 250 also could be significantly reduced. In various embodiments, the secured party 120 may also be able to prevent the debtor 110 from accessing the account 250 instead of the secured party 120 transferring the funds from the account 250 to another account (e.g., the secured party's 120 account).

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

Appendix A—The following Model Form of Deposit Account Control Agreement (as contemplated by the provisions of Section 9-104 of Revised Article 9 of the Uniform Commercial Code) was produced by the Joint Task Force on Deposit Account Control Agreements of the Business Law Section of the American Bar Association ("ABA"). The provisions of the ABA's Model Form have not been approved by the House of Delegates or Board of Governors of the ABA and, accordingly, should not be construed as representing the policy of the ABA. The ABA Model Form of DACA appears below, and it also is available from the ABA's Business Law Section at http://www.abanet.org/dch/committee.cfm?com=CL710060.

Deposit Account Control Agreement version 1 dated Feb. 13, 2006 Executed and Delivered as of, 20

Parties

This Agreement is among the persons signing this Agreement as the "Secured Party", the "Debtor" and the "Bank".

Background

The Debtor is the Bank's customer with respect to one or more demand deposit accounts identified by the account numbers specified below (individually and collectively, as re-numbered and including any funds in the account or accounts, the "Deposit Account"). The Debtor has granted the Secured Party a security interest in the Deposit Account. The Debtor is requesting that the Bank enter into this Agreement. The Bank is willing to do so upon the terms contained in this Agreement.

This Agreement includes the General Terms, the Specific Terms and the Exhibit, each as defined or referred to below.

Agreements

A. GENERAL TERMS. This Agreement is subject to the General Terms for Deposit Account Control Agreement version 1 dated Feb. 13, 2006, developed by a special task force of the American Bar Association's Business Law Section and available from the Business Law Section at http://www.abanet.org/dch/committee.cfm?com=CL710060 (the "General Terms"). The General Terms are incorporated in this Agreement by reference and without modification except as may be provided in Section 10 of the Specific Terms.

B. SPECIFIC TERMS. The following terms (the "Specific Terms") complete, supplement or modify the General Terms:

1. Deposit Account (see "Background" above). The following account or accounts comprise the Deposit Account [list by account number]:

2. Business Day (see definition of "Business Day" in Section 1 of the General Terms):

A day will not be considered as a "Business Day" if commercial banks in the following city or cities are closed on that day: _____. If the preceding sentence is not completed, no additional days are excluded from the definition of "Business Day".

3. Outside Time (see definition of "Outside Time" in Section 1 of the General Terms):

If the Outside Time is to be based on a period of less than two Business Days, the following is the earlier period: _____. If an earlier period is not inserted in the preceding sentence, then the Outside Time will be based on two Business Days.

4. Disposition of less than all or multi-disposition of funds (see Section 4(a)(ii)(E) of the General Terms):

The following is any computation or formula by which a Disposition Instruction originated by the Secured Party may provide for a disposition of less than all of the funds in the Deposit Account and whether there may be multiple recipients of the funds:

If the preceding paragraph is not completed to permit a disposition of less than all of the funds in the Deposit Account, then a Disposition Instruction originated by the Secured Party must be for a disposition of all of the funds. If the preceding paragraph is not completed to permit a disposition of the funds in the Deposit Account to multiple recipients, then a Disposition Instruction originated by the Secured Party must require that the funds be sent to a single recipient.

5. Reimbursement Claim Period (see Section 6(b) of the General Terms):

The number of days following the termination of the Agreement in which a reimbursement claim must be made against the Secured Party under Section 6(b) of the General Terms is _____. If a number is not inserted in the preceding sentence, the number is 90.

6. Electronic Records (see definition of "writing" in Section 1 of the General Terms):

Checking this line _____ means that the parties permit a writing to include an electronic record and permit communications by email. Otherwise, the parties do not permit a writing to include an electronic record and do not permit communications by email.

7. Governing Law (see Section 13(a) of the General Terms):

The jurisdiction whose law governs this Agreement is _____. If a jurisdiction is not inserted in the preceding sentence, the jurisdiction will be determined by applicable law.

8. Bank's Jurisdiction for UCC Purposes (see Section 13(b) of the General Terms):

The Bank's jurisdiction for purposes of part 3 of UCC Article 9 is _____. If the Bank's jurisdiction for such purposes is not inserted in the preceding sentence, the Bank's jurisdiction for such purposes will be determined by applicable law.

9. Delivery of Executed Copy (see Part D):

Checking this line _____ means that the delivery of an executed copy of this Agreement may be made by electronic transmission in addition to a transmission by facsimile. Otherwise, delivery of an executed copy of this Agreement may not be made by a form of electronic transmission other than facsimile.

10. Additional Provisions (see Section 12(b) of the General Terms):

The following provisions modify or supplement the General Terms:

If no provisions are inserted above in this Section 10, then there are no modifications to or supplements of the General Terms.

C. EXHIBIT. The parties have completed and attach hereto the Exhibit to be used as the form of the Initial Instruction. [Note to person completing this Agreement: the Exhibit requires the designation of the person or persons or department at the Bank to receive the Initial Instruction. See Note 1 to the Exhibit.]

D. SINGLE AGREEMENT; COUNTERPARTS. The General Terms, the Specific Terms and the Exhibit shall be read and construed together with the other provisions of this Agreement as a single agreement. Delivery of executed copies of this Agreement may be made by facsimile or, if so permitted in Section 9 of Part B, by another form of electronic transmission. This Agreement may be executed in counterparts, each of which shall constitute an original and all of which collectively shall constitute a single agreement.

Signatures

Debtor:
By:
Name:
Title:
Address:
Attention:
Telephone Number (for information only):
Facsimile Number:
Electronic mail address (if Section 6 of Part B permits):
Secured Party:
By:
Name:
Title:
Address:
Attention:
Telephone Number (for information only):
Facsimile Number:
Electronic mail address (if Section 6 of Part B permits):
Bank:
By:
Name:
Title:
Address:
Attention:
Telephone Number (for information only):
Facsimile Number:
Electronic mail address (if Section 6 of Part B permits):

Exhibit

Letterhead of the Secured Party

Deposit Account Control Agreement

Initial Instruction

Date

[Name of Bank]
[Address of Bank]
  Attention:
  [Person or Persons or Department] [See Note 1 below]
Ladies and Gentlemen:

This is the Initial Instruction as defined in the Deposit Account Control Agreement dated _____, 20_____, among you, us and [Debtor] (the "Debtor") (as currently in effect, the "Control Agreement"). A copy of the Control Agreement as fully executed is attached. Capitalized terms used in this Initial Instruction have the meanings given them in the Control Agreement This Initial Instruction directs the Bank no longer to comply with the Debtor's Disposition Instructions.

[As an included Disposition Instruction, we direct you to send the funds in the Deposit Account to us by the method and at the address indicated below. We recognize that, as a condition to your complying with this Disposition Instruction and to the extent that we have not already done so, we must provide to you evidence reasonably required by you as to the authority of the person giving this Disposition Instruction to act for us. We also recognize that your obligation to comply with this Disposition Instruction is subject to the other provisions of Section 4(a)(ii) of the General Terms. [See Note 2 below]

Funds transfer instructions:
Receiving bank:
ABA routing number for domestic wire:
ABA routing number for ACH transaction:
International: Swift Code No.
Reference details:

Very truly yours,

Secured Party

By

Title

Notes to the person completing this form of Initial Instruction:

1. The "attention" line should be completed with particular care. Until the Initial Instruction is actually received by the person or persons or department at the Bank designated in the "attention" line, the time period by which the Bank must comply with the Initial Instruction will not commence. Accordingly, it is advisable to provide in the "attention" line a specific department or specific officer or officers at the Bank by title rather than by name. If an individual at the Bank is to be designated by title or even by name, it is advisable that one or more additional individuals at the Bank be designated as alternatives to receive the Initial Instruction if the first individual is not available.

2. The bracketed language relating to a Disposition Instruction (including funds transfer instructions) is optional. Not including this language does not preclude the Secured Party from subsequently giving a Disposition Instruction.

© 2000-2007 American Bar Association

Appendix B—The following General Terms for the Model Form of Deposit Account Control Agreement (as contemplated by the provisions of Section 9-104 of Revised Article 9 of the Uniform Commercial Code) above was produced by the Joint Task Force on Deposit Account Control Agreements of the Business Law Section of the American Bar Association ("ABA"). The provisions of the ABA's General Terms for the Model Form of Deposit Account Control Agreement have not been approved by the House of Delegates or Board of Governors of the ABA and, accordingly, should not be construed as representing the policy of the ABA. The ABA General Terms for the Model Form of Deposit Account Control Agreement appears below, and it also is available from the ABA's Business Law Section at http://www.abanet.org/dch/committee.cfm?com=CL710060.

General Terms for the Deposit Account Control Agreement

1. Definitions and Rules of Interpretation. In this Agreement (a) terms defined in the UCC and not otherwise defined in this Agreement have the same meanings in this Agreement as in the UCC, (b) the rules of interpretation in Article 1 of the UCC apply to the interpretation of this Agreement and (c) the term "or" is not exclusive. Unless otherwise stated, section references are to sections of these General Terms. In addition, the following terms in this Agreement have the following meanings or interpretations:

This "Agreement" means the Deposit Account Control Agreement dated the Agreement Date among the Secured Party, the Debtor and the Bank. The Deposit Account Control Agreement includes these General Terms (incorporated by reference), the Specific Terms and the Exhibit read and construed together as a single agreement.

"Agreement Date" means the date set forth at the beginning of this Agreement as the date as of which this Agreement was executed and delivered by the parties.

An "address" includes the person or persons or department of the Bank on an "attention" line.

"Bank" means the organization signing this Agreement as the Bank.

"Business Day" means:

(i) for communications to the Bank, a day other than a day (A) that is not a "business day" as defined in Federal Reserve Board Regulation CC, 12 CFR Part 229, (B) on which the office, branch or department of the Bank specified as the Bank's address in the Exhibit is closed, or (C) on which commercial banks are closed in the city or cities set forth in the Specific Terms; and (ii) for communications to any other party, a day, other than a Saturday or Sunday, on which the other party is open for business at the location to which the communication is sent.

"Claim" means a claim, loss, cost or expense, and includes out-of-pocket or allocable internal legal fees and expenses incurred in bringing or defending a claim.

A "communication" includes the Initial Instruction, a Disposition Instruction or a notice.

"Debtor" means the person signing this Agreement as the Debtor.

"Deposit Account" has the meaning set forth in the "Background" of this Agreement. The Deposit Account is identified in Section 1 of the Specific Terms.

"Deposit-related Agreements" means, collectively, the deposit account agreement and any other agreements between the Bank and the Debtor governing the Deposit Account and any cash management or similar services provided by the Bank to the Debtor in connection with the Deposit Account.

"Disposition Instruction" means an instruction to the Bank directing the disposition of the funds in the Deposit Account.

"Exhibit" means the Exhibit referred to in Part C of and attached to this Agreement as the form to be used as the Initial Instruction.

"Initial Instruction" means the first instruction to the Bank originated by the Secured Party directing that the Bank no longer comply with the Debtor's Disposition Instructions. The Initial Instruction may also contain a Disposition Instruction originated by the Secured Party.

"Order or Process" means an order, judgment, decree or injunction, or a garnishment, restraining notice or other legal process, directing, or prohibiting or otherwise restricting, the disposition of the funds in the Deposit Account.

"Outside Time" means, unless an earlier Outside Time is stated in the Specific Terms, the opening of business on the second Business Day after the Business Day on which the Initial Instruction in substantially the form of the Exhibit is actually received at the address for the Bank specified in the Exhibit. If the Initial Instruction is actually received at that address after 12:00 noon, local time, at that address, then in determining the Outside Time, the Initial Instruction will be considered to have been actually received on the following Business Day.

"Secured Party" means the person signing this Agreement as the Secured Party, whether the person is acting in a representative capacity or otherwise.

"Specific Terms" means the terms contained in Part B of this Agreement.

"UCC" means the Uniform Commercial Code of the jurisdiction whose law governs this Agreement or, if relevant to any matter other than the meaning of a defined term, the Uniform Commercial Code of the jurisdiction whose law applies to the matter under the choice of law rules of the jurisdiction whose law governs this Agreement.

A "writing" means a tangible writing, including a facsimile and, if the Specific Terms permit, an electronic record; "written" refers to a communication in the form of a writing.

2. The Debtor's Dealings with the Deposit Account.

Except as provided in Section 2(b), the Bank may comply with the Debtor's Disposition Instructions in accordance with the Deposit-related Agreements.

The Bank will not comply with the Debtor's Disposition Instructions after the Outside Time. In its discretion the Bank may cease complying with the Debtor's Disposition Instructions at an earlier time as permitted by Section 4(a)(iv).

3. The Secured Party's Right to Give Instructions as to the Deposit Account. The Bank will comply with the Initial Instruction, and with any Disposition Instructions originated by the Secured Party, in each case (i) without the Debtor's further consent, and (ii) even if following the instruction results in the dishonoring by the Bank of items presented for payment from the Deposit Account or the Bank otherwise not complying with the Debtor's Disposition Instructions. The Initial Instruction may not be rescinded or otherwise modified without the Bank's consent.

4. Exculpation of the Bank.

(a) Notwithstanding the Bank's agreements in Sections 2 and 3, the Bank will not be liable to any other party for:

(i) either failing to follow an Initial Instruction that (A) is not in the form of the Exhibit, (B) does not specify the address to which the Initial Instruction was to have been sent, (C) is not otherwise completed, or (D) does not have attached to it a copy of this Agreement as fully executed or, as a result of any such defect in the Initial Instruction, continuing to comply with the Debtor's Disposition Instructions;

(ii) failing to follow a Disposition Instruction originated by the Secured Party (A) before the Outside Time, (B) that requires the disposition of the funds in the Deposit Account by a method not available to the Debtor under the Deposit-related Agreements, (C) that the Bank determines would result in the Bank's failing to comply with a statute, rule or regulation, or an Order or Process, binding upon the Bank, (D) that requires the disposition of funds that are not immediately available in the Deposit Account, (E) that, unless otherwise set forth in the Specific Terms, directs the disposition of less than all the funds in the Deposit Account or directs that the funds be sent to more than one recipient, or (F) for which the Bank has not received evidence reasonably required by the Bank as to the authority of the person giving the Disposition Instruction to act for the Secured Party;

(iii) complying with the Debtor's Disposition Instructions, or otherwise completing a transaction involving the Deposit Account, that the Bank or an affiliate had started to process before the Outside Time; or (iv) after the Bank becomes aware that the Secured Party has sent the Initial Instruction, but before the Outside Time, complying with the Initial Instruction or a Disposition Instruction originated by the Secured Party, notwithstanding any fact or circumstance and even if the Initial Instruction (A) has not been actually received at the address specified in the Exhibit, (B) fails to have attached to it a copy of this Agreement as fully executed, or (C) is not completed or otherwise fails to be in the form of Initial Instruction set forth on the Exhibit.

(b) The Bank will not be liable to any other party for:

(i) wrongful dishonor of any item as a result of the Bank following the Initial Instruction or any Disposition Instruction originated by the Secured Party, (ii) failing to comply or delaying in complying with the Initial Instruction, any Disposition Instruction or any provision of this Agreement due to a computer malfunction, interruption of communication facilities, labor difficulties, act of God, war, terrorist attack, or other cause, in each case beyond the Bank's reasonable control, (iii) any other Claim, except to the extent directly caused by the Bank's gross negligence or willful misconduct, or any indirect, special, consequential or punitive damages.

(c) The Bank will have no fiduciary duties under this Agreement to any other party, whether as trustee, agent, bailee or otherwise. The Bank will have no duties to the Secured Party except as expressly set forth in this Agreement. The Bank will have no duty to inquire into or determine the existence or enforceability of the Debtor's obligations to the Secured Party or whether, under any separate agreement between the Debtor and the Secured Party, the Debtor's obligations to the Secured Party are in default, the Debtor may originate a Disposition Instruction or the Secured Party may originate the Initial Instruction or any Disposition Instruction.

5. The Bank's Recourse to the Deposit Account.

(a) Except for amounts referred to in Section 5(*b*), the Bank (i) subordinates any security interest, lien or other encumbrance against the Deposit Account to the Secured Party's security interest and (ii) will not exercise any right of recoupment, setoff or debit against the Deposit Account. This subordination will not apply to any security interest that the Bank has in an item under UCC Article 4 as a collecting bank.

(b) Notwithstanding Section 5(a), and regardless of any agreement of the Debtor to compensate the Bank by means of balances in the Deposit Account, the Bank may charge the Deposit Account, to the extent permitted by any of the Deposit-related Agreements or applicable law, for:

(i) the face amount of a check, draft, money order, instrument, wire transfer of funds, automated clearing house entry, credit from a merchant card transaction, other electronic transfer of funds or other item (A) deposited in or credited to the Deposit Account, whether before or after the Agreement Date, and returned unpaid or otherwise uncollected or subject to an adjustment entry, whether for insufficient funds or for any other reason and without regard to the timeliness of the return or adjustment or the occurrence or timeliness of any other person's notice of nonpayment or adjustment, (B) subject to a claim against the Bank for breach of transfer, presentment, encoding, retention or other warranty under Federal Reserve Regulations or Operating Circulars, clearing house rules, the UCC or other applicable law, or (C) for a merchant card transaction, against which a contractual demand for chargeback has been made;

(ii) normal service charges or fees payable to the Bank in connection with the Deposit Account or any related services;

(iii) any adjustments or corrections of any posting or encoding errors; and (iv) reimbursements for out-of-pocket or allocable internal legal fees and expenses in connection with the negotiation, administration or enforcement of this Agreement by the Bank.

6. Indemnification and Reimbursement.

(a) The Debtor indemnifies the Bank against all Claims incurred, sustained or payable by the Bank arising out of this Agreement except to the extent directly caused by the Bank's gross negligence or willful misconduct.

(b) The Secured Party agrees to reimburse the Bank for any charge against the Deposit Account under Section 5(b) for which there were insufficient funds in the Deposit Account to satisfy the charge. Such reimbursement will be limited to the aggregate amount transferred from the Deposit Account as a result of the Bank's acting upon Disposition Instructions originated by the Secured Party or pursuant to Section 9(b). Any demand by the Bank for reimbursement must be made within the number of days after the termination of this Agreement set forth in the Specific Terms. The Bank may not make a Claim for reimbursement under this subsection unless the Debtor fails to satisfy the Claim within 15 days after the Bank makes a demand on the Debtor under Section 6(a) or (ii) the Bank is enjoined, stayed or prohibited by operation of law from making the demand on the Debtor.

(c) The Secured Party's reimbursement obligations under Section 6(b) will not apply to (i) a charge for reimbursement of or indemnification for any out-of-pocket or allocable internal legal fees and expenses incurred by the Bank in connection with any claim or defense by the Bank against the Secured Party relating to this Agreement or (ii) the amount of any loss incurred by the Bank to the extent directly caused by the Bank's gross negligence or willful misconduct. If the Bank satisfies any Claim against the Debtor referred to in the foregoing clause (i) by charging the Deposit Account, the amount of the Secured Party's maximum liability for reimbursement obligations under Section 6(b) will be reduced by the amount of the Claim so satisfied.

(d) If the Secured Party fails to reimburse the Bank for any amount under Section 6(b), the Secured Party will pay the Bank's out-of-pocket or allocable internal legal fees and expenses in collecting from the Secured Party the amount payable.

(e) The Secured Party indemnifies the Bank against all other Claims incurred, sustained or payable by the Bank arising from the Bank following an Initial Instruction or a Disposition Instruction originated by the Secured Party, or from the Bank's remittance of funds pursuant to Section 9(b), except to the extent directly caused by the Bank's gross negligence or willful misconduct.

7. Representations and Warranties; Agreements with Other Persons. The Bank represents and warrants to the Secured Party that the Bank (i) is an organization engaged in the business of banking, (ii) maintains the Deposit Account as a demand deposit account or accounts in the ordinary course of the Bank's business and (iii) has not entered into any currently effective agreement with any person under which the Bank may be obligated to comply with Disposition Instructions originated by a person other than the Debtor or the Secured Party. The Bank will not enter into any agreement with any person under which the Bank may be obligated to comply with Disposition Instructions originated by a person other than the Debtor or the Secured Party.

8. Deposit Account Information. If the Secured Party so requests, to the extent that the Bank has the operational ability to do so, the Bank will provide to the Secured Party, whether by Internet access or otherwise, a copy of each periodic account statement relating to the Deposit Account ordinarily furnished by the Bank to the Debtor. The Bank's liability for failing to provide the account statement will not exceed the Bank's cost of providing the statement. The Debtor authorizes the Bank to provide to the Secured Party, whether by Internet access or otherwise, any other information concerning the Deposit Account that the Bank may agree to provide to the Secured Party at the Secured Party's request.

9. Termination; Closure of the Deposit Account.

(a) Neither the Debtor nor the Bank will close the Deposit Account prior to termination of this Agreement. This Agreement may not be terminated by the Debtor except by a notice to the Bank given jointly by the other parties. This Agreement may be terminated (i) by the Secured Party at any time by notice to the other parties and (ii) by the Bank (A) immediately upon notice to the other parties if the Bank becomes obligated to terminate this Agreement or to close the Deposit Account under any statute, rule or regulation, or any Order or Process, binding upon the Bank, (B) upon five Business Days' notice to the other parties if any other party is in material breach of any of the Deposit-related Agreements or this Agreement, and (C) otherwise upon 30 days' notice to the other parties.

(b) If the Bank terminates this Agreement pursuant to clause (A) of Section 9(a)(ii), the Bank will remit any funds in the Deposit Account on the date of termination (i) at the direction of the Secured Party if the direction is received by the Bank prior to the date of termination of this Agreement or (ii) if no such direction is received by the Bank prior to such date, by check mailed to the address of the Secured Party for receiving communications under this Agreement. If the Bank terminates this Agreement pursuant to clause (B) or (C) of Section 9(a)(ii), the Bank will remit any funds in the Deposit Account on the date of termination at the direction of the Secured Party only if the direction is received by the Bank prior to the date of termination of this Agreement. Any obligation of the Bank to remit any funds to or at the direction of the Secured Party under this subsection is subject to clauses (B) through (F) of Section 4(a)(ii).

(c) Except as provided in Section 9(b) and in any event if the Secured Party has communicated to the Bank that the Secured Party does not wish to receive or direct the disposition of the funds, the Secured Party will not receive from the Bank any remittance of funds from the Deposit Account upon termination of this Agreement by the Bank.

(d) The termination of this Agreement will not affect any rights created or obligations incurred under this Agreement before the termination. Sections 4 and 6 will survive the termination of this Agreement for actions taken or omitted before the termination. Sections 9(b) and (e) will survive the termination of this Agreement, and Section 5 will survive the termination of this Agreement solely for any funds to be remitted to or at the direction of the Secured Party pursuant to Section 9(b).

10. Communications.

(a) All communications under this Agreement must be in writing and must be delivered by hand or overnight courier service, mailed by certified or registered mail, or sent by facsimile to the party addressee. If the Specific Terms permit a writing to include an electronic record, a communication, other than the Initial Instruction, may be sent by email.

(b) For a communication under this Agreement to be effective, it must be received (i) for the Initial Instruction, at the Bank's address specified on the Exhibit and (ii) in all other cases, at the party's address indicated below the party's signature to this Agreement, in each case subject to any change in address provided in Section 10(c). Receipt of the Initial Instruction does not occur until it is received by the person or persons or department specified on the "attention" line on the Exhibit. If more than one person is specified, receipt occurs when the Initial Instruction is received by one of the persons.

(c) The Bank may communicate to the Secured Party changes in the address for the Initial Instruction, and any party may communicate to the other parties changes in its address for communications under this Agreement.

11. Successors and Transferees.

(a) This Agreement will inure to the benefit of, and be binding upon, the parties and their respective successors and other transferees permitted under this Section. Except as provided in this Section, a voluntary transfer of a party's rights or duties under this Agreement without the written consent of the other parties will be void.

(b) The Bank may transfer its rights and duties under this Agreement to a transferee to which, by contract or operation of law, the Bank transfers substantially all of its rights and duties under the Deposit-related Agreements.

(c) The Secured Party may transfer its rights and duties under this Agreement to (i) a transferee to which, by contract or operation of law, the Secured Party transfers substantially all of its rights and duties under the financing or other arrangements between the Secured Party and the Debtor for which the Deposit Account acts as collateral security or (ii) if the Secured Party is acting as a trustee, indenture trustee, agent, collateral agent, or other representative in whose favor a security interest is created or provided for, a transferee that is a successor trustee, indenture trustee, agent, collateral agent, or other representative.

(d) No transfer under this Section will be binding upon a non-transferring party until the transferring party or the transferee notifies the non-transferring parties of the transfer in a writing signed by the transferee that identifies the transferee, gives the transferee's address for communications under this Agreement, and states that the transferee is a successor of the transferor or other transferee permitted under this Section and is entitled to the benefit of the transferring party's rights and has assumed all of the transferring party's duties under this Agreement.

(e) A non-transferring party need not request proof of any transfer or that the transferee is a successor of the transferor or other transferee permitted by this Section. If requested by a non-transferring party, however, the transferring party or the transferee will provide reasonable proof thereof. If the Bank or the Secured Party, as a non-transferring party, requests such proof, then the effectiveness of the notification of transfer as to the non-transferring party will be suspended until the proof is provided.

(f) When a transfer becomes binding on the non-transferring parties, the transferring party will not be entitled to exercise any rights, and will be relieved of its obligations, accruing under this Agreement from and after that time. Those rights may be exercised and those obligations will be incurred by the transferee.

(g) The provisions of subsections (d) and (e) requiring notification for a transfer to be binding on the non-transferring parties and suspending the effectiveness of the notification of transfer until reasonable proof of the transfer has been provided do not apply to the Bank as the transferring party if the transfer is by operation of law and by operation of the law (i) the transferee succeeds to all or substantially all of the rights and becomes generally bound by all of the duties of the Bank, including the Bank's duties under this Agreement, and (ii) the Bank ceases to exist.

12. Entire Agreement; Relation to Other Agreements.

(a) This Agreement constitutes the entire agreement of the parties, and supersedes all previous and contemporaneous negotiations, understandings and agreements, with respect to its subject matter, all of which have become merged and finally integrated into this Agreement.

(b) If a term in the Specific Terms conflicts with a term of this Agreement not in the Specific Terms, the term in the Specific Terms controls.

(c) If this Agreement conflicts with any of the Deposit-related Agreements, this Agreement will control. However, this Agreement will not (i) derogate from any Claim or defense that the Bank may have against the Debtor under any of the Deposit-related Agreements or (ii) create any third party beneficiary rights under any of the Deposit-related Agreements in favor of the Secured Party.

(d) This Agreement does not amend or otherwise modify any of the agreements between the Debtor and the Secured Party or provide any rights for the Debtor to originate a Disposition Instruction in contravention of any agreement between the Debtor and the Secured Party.

13. Governing Law, Depositary Bank's Jurisdiction and Waiver of Jury Trial.

(a) Except as otherwise required by Article 9 of the UCC, this Agreement will be governed by the law of that jurisdiction set forth in the Specific Terms without giving effect to any choice of law rule that would require the application of the law of another jurisdiction.

(b) If the Specific Terms are completed expressly to designate the Bank's jurisdiction for purposes of part 3 of Article 9 of the UCC, then the Deposit-related Agreements are amended to provide that for those purposes that jurisdiction is the Bank's jurisdiction so designated.

To the extent permitted by applicable law, each party waives all rights to trial by jury in any action, claim or proceeding (including any counterclaim) of any type arising out of or directly or indirectly relating to this Agreement.

14. Miscellaneous.

(a) No amendment to this Agreement will be binding on any party unless it is in writing and signed by all of the parties. Any provision of this Agreement benefiting a party may be waived only by a writing signed by that party.

(b) If a provision of this Agreement is held invalid or unenforceable in any respect, the validity or enforceability of the remaining provisions will not in any way be affected, it being understood that the invalidity or unenforceability of an affected provision in a particular jurisdiction will not in and of itself affect the validity or enforceability of the provision in any other jurisdiction.

What is claimed is:

1. A programmable computer system for facilitating the secure administration of a deposit account control agreement, the computer system comprising:

(a) means for a banking application, supported by the programmable computer system, configured to communicate with one or more of an obligor and an obligee, wherein the obligee has a lien on a deposit account pledged to the obligee by the obligor to secure an obligation of obligor;

(b) means for a transaction application, supported by the programmable computer system, configured to allow the obligee to electronically initiate the withdrawal or transfer funds from the deposit account without prior notification of or manual instruction for the withdrawal to a bank, and without the active human participation of bank employees; and (c) means for a user interface, supported by the programmable computer system, configured to display a balance in the deposit account, to accept instructions electronically from the obligee to transfer or withdraw funds from the deposit account, and to accept a first PIN to allow the obligor to access and control the deposit account and a second PIN to allow the obligee to also access and control the deposit account, and wherein the first PIN and the second PIN do not provide the same type of access to and control over the deposit account.

2. The system of claim 1, wherein the means for a banking application is further configured to transmit a notification to the obligor or to the obligee.

3. The system of claim 2, wherein the notification indicates that funds in the deposit account have become available for withdrawal or transfer.

4. The system of claim 2, wherein the notification indicates that the obligee has transferred funds from the deposit account.

5. The system of claim 1, wherein the means for a user interface is further configured to accept instructions electronically from the obligee to terminate the obligor's access to the deposit account.

6. The system of claim 5, wherein the means for a banking application is further configured to transmit a notification indicating that the obligee has terminated the obligor's access to the deposit account.

7. The system of claim 2, wherein the obligee is notified using one or more of the group comprising an e-mail, text message, and display within the user interface.

8. The system of claim 1, wherein the means for the user interface is further configured to accept data describing a minimum balance of funds that the obligor must maintain in the deposit account.

9. The system of claim 8, wherein the means for a banking application is further configured to transmit a notification to the obligor and/or the obligee indicating that the balance in the deposit account is less than the described minimum balance.

10. The system of claim 1, wherein the means for a user interface is further configured to accept data describing a minimum average balance of funds that the obligor must maintain in the deposit account.

11. The system of claim 10, wherein the means for a banking application is further configured to transmit a notification to the obligor and/or the obligee indicating that the average daily balance in the deposit account is less than the described, minimum average daily balance.

12. The system of claim 1, wherein the first PIN allows the obligor to electronically access and control the deposit account.

13. The system of claim 12, wherein the obligee also uses the first PIN to access and control the deposit account as if the obligee were a joint account holder of the deposit account with the obligor.

14. The system of claim 12, wherein the second PIN allows the obligee to electronically access and control the deposit account as a joint account holder.

15. The system of claim 1, wherein the means for a user interface is further configured to display a balance of funds for two or more deposit accounts, and wherein the obligee has a lien on each of the deposit accounts.

16. The system of claim 15, wherein two or more of the deposit accounts that are subject to a deposit account control agreement belong to the obligor.

17. The system of claim 15, wherein one or more of the deposit accounts belongs to a second obligor.

18. The system of claim 1, wherein the lien is a security interest.

19. The system of claim 1, wherein the lien is pledged by the obligor to secure one of the group comprising a loan, covenant, guarantee, indemnity, escrow, and bond.

20. A method using a computer system of an obligee securing an obligation with a deposit account owned by the obligor, comprising the steps of:
   executing a deposit account control agreement with an obligor and a bank;
   receiving an obligation from the obligor;
   receiving a lien on a deposit account on the computer system, wherein the deposit account is owned by the obligor, and wherein the deposit account is pledged to secure the obligation;
   receiving a second PIN from the bank to allow the obligee to access and control the deposit account wherein the second PIN does not provide the same type of access to and control over the deposit account, as a first PIN to allow the obligor to access and control the deposit account;
   using the computer system to access and control the deposit account on the computer system using the PIN; and
   using the computer system to withdraw or transfer funds in the deposit account by the obligee without prior notification of or manual instruction for the withdrawal to the bank, and without the active human participation of bank employees.

21. The method of claim 20, wherein the second PIN is a joint account holder PIN.

22. The method of claim 20, wherein one or more of the deposit accounts belong to the obligor.

23. The method of claim 20, wherein one or more of the deposit accounts belong to one or more different obligors.

24. The method of claim 20, further comprising: transferring funds from the deposit account to a second account when the obligor is in default, wherein the second account is inaccessible to the obligee.

25. The method of claim 20, further comprising: receiving a notification in the event that funds become available in the deposit account, wherein the notification is generated and delivered automatically.

26. The method of claim 20, wherein the notification is one or more of the group comprising an e-mail, text message, and display within a graphical user interface.

27. The method of claim 20, further comprising: terminating the obligor's access to the deposit account electronically.

28. The method of claim 20, further comprising: receiving a notification in the event that a balance in the deposit account falls below a minimum threshold amount specified in the deposit account control agreement, wherein the notification is generated and delivered automatically.

29. The method of claim 28, wherein the notification is one or more of the group comprising an e-mail, text message, and display within a graphical user interface.

30. The method of claim 20, wherein the lien is a security interest.

31. The method of claim 20, wherein the lien is pledged to secure one of the group comprising a loan, a covenant, a guarantee, an indemnity, an escrow, and a bond.

32. The method of claim 20, wherein the bank is an institution licensed to receive deposits and engage in the business of commercial banking.

33. The method of claim 20, wherein the obligor is one of the group comprising an individual, a sole proprietor, a corporation, a limited liability company, a limited liability partnership, a cooperative, a partnership, a trust, and a joint venture.

34. A method using a computer system of administering a deposit account, comprising the steps of:
   executing a deposit account control agreement with an obligor and an obligee, wherein the obligor grants the obligee a lien on a deposit account on the computer system to secure an obligation of the obligor to the obligee;
   providing a second PIN to the obligee, wherein the obligee can access the deposit account using the second PIN, to allow the obligee to access and control the deposit account wherein the second PIN does not provide the same type of access to and control over the deposit account, as a first PIN to allow the obligor to access and control the deposit account;
   and
   using the computer system to initiate electronically by the obligee the transfer of funds from the deposit account on the computer system, wherein the obligee does not provide prior notification of or manual instruction for the withdrawal to a bank, and does not use the active human participation of bank employees.

35. The method of claim 34, wherein the second PIN is a joint account holder PIN and the obligee can access and control the deposit account using the joint account holder second PIN.

36. The method of claim 34, wherein one or more of the deposit accounts belong to the obligor.

37. The method of claim 34, wherein one or more of the deposit accounts belongs to one or more different obligors.

38. The method of claim 34, further comprising:
   sending an electronic notification to the obligee automatically in the event that additional funds become available in the deposit account after the obligee has transferred funds out of the deposit account.

39. The method of claim 38, wherein the notification is one of the group comprising an e-mail, text message, and display within a graphical user interface.

40. The method of claim 34, further comprising:
   sending an electronic notification to the obligee automatically in the event that a balance of funds in the deposit account falls below a threshold specified in the provisions of the deposit account control agreement.

41. The method of claim 40, wherein the notification is one of the group comprising an e-mail, text message, and display within a graphical user interface.

42. The method of claim 34, wherein the lien is a security interest.

43. The method of claim 34, wherein the obligation is one of the group comprising a loan, a covenant, a guarantee, an indemnity, an escrow, and a bond.

44. The method of claim 34, wherein the obligor one of the group comprising an individual, a sole proprietor, a corporation, a limited liability company, a limited liability partnership, a cooperative, a partnership, a trust, and a joint venture.

45. The method of claim 34, wherein the obligee is one of the group comprising an individual, a sole proprietor, a corporation, a limited liability company, a limited liability partnership, a cooperative, a partnership, a trust, and a joint venture.

* * * * *